United States Patent [19]

Olsson

[11] 4,322,021
[45] Mar. 30, 1982

[54] DEVICE FOR OPENING AND CLOSING THE OUTLET OF A WORM CONVEYOR

[75] Inventor: Rolf Olsson, Trångsund, Sweden

[73] Assignee: Alfa-Laval AB, Tumba, Sweden

[21] Appl. No.: 132,810

[22] Filed: Mar. 24, 1980

[30] Foreign Application Priority Data

Mar. 22, 1979 [SE] Sweden ..................... 7902584

[51] Int. Cl.³ ............................................. B65G 47/19
[52] U.S. Cl. ..................................... 222/231; 198/531; 198/671; 222/240; 222/311; 222/413
[58] Field of Search ............... 222/231, 239, 240, 310, 222/311, 413, 226, 233, 237, 313, 378, 380, 508; 221/75; 198/531, 558, 671; 64/DIG. 2

[56] References Cited

U.S. PATENT DOCUMENTS

| | | | |
|---|---|---|---|
| 1,520,669 | 12/1924 | Ziegner | 222/311 |
| 2,002,420 | 5/1935 | Strosk | 222/240 |
| 2,527,876 | 10/1950 | Curtis | 222/413 X |
| 2,699,272 | 1/1955 | Barth | 222/413 |
| 2,753,089 | 7/1956 | Phillips | 222/240 X |
| 3,333,679 | 8/1967 | Zimmermann et al. | 222/413 X |

*Primary Examiner*—Howard N. Goldberg
*Assistant Examiner*—Fred A. Silverberg
*Attorney, Agent, or Firm*—Cyrus S. Hapgood

[57] ABSTRACT

At its outlet end, a rotary feed screw coacts with a control element which, in a first position relative to the screw, closes a delivery conduit. To effect a dispensing operation, the control element is moved to a second position relative to the screw to form therewith a discharge opening through the delivery conduit, the dispensing being effected by rotating the screw and said opening together to maintain said opening. When the dispensing is to be stopped, the control element is returned to its first position relative to the screw.

9 Claims, 2 Drawing Figures

DEVICE FOR OPENING AND CLOSING THE OUTLET OF A WORM CONVEYOR

The present invention relates to a dispenser comprising a delivery conduit communicating with a hopper and a feed screw operable within the circular cylindrical part of said conduit to convey the stuff to be dispensed to an outlet from the feed conduit. The invention especially is related to a dispenser which is suitable for animal feeding, and consequently the description below mainly refers to this field of application. It should be emphasized, however, that the invention is directly applicable within any field wherever an accurate volume portioning by means of a feed screw or a distinct closing of a screw conveyor is required.

BACKGROUND OF THE INVENTION

Volume dispensers based on feed screws and used in stalls or on feed trucks are often used as being somewhat cheaper and simplier alternatives compared with weight dispensers. Usually horizontal or upward directed feed conduits with constantly open outlets are used. Due to the pulsating delivery obtained from such devices, a certain inaccuracy in the portioning, as determined by the occasional stop position of the screw, must be accepted. A further disadvantage with open feed conduit at animal feeding is that the animals by means of impacts and bangings on the device or the stall equipment with a certain success can get feed stuff out from the device even between feeding periods, thereby further reducing the portioning accuracy and damaging the equipment.

To solve the above mentioned problems, it has been proposed to provide portioning devices with various closing devices. According to one proposal, which relates to a dispenser with horizontal feed screw, in order to prevent further feed stuff delivery after the screw has stopped, the end of the feed tube has been provided with a cylindrical shutter device that through control means can be turned concentrically around the feed tube. Another proposal provides a horizontal screw dispenser, the outlet end of which is simply provided with a shutter being operable in the vertical direction. Beside the fact that these shutter devices fixed to the feed tube require comparatively awkward control equipment to be automatically synchronized with the dispenser screw, the range of uncertainty depending on the said pulsating delivery can only be partially reduced in this way.

Even screw based volume dispensers having vertical or downwards sloping delivery tube have been suggested for the purpose of avoiding said pulsating delivery. As closing means in this context, it has been suggested to use gates pivotally or slidably fixed at the delivery tube. In addition to the problem already mentioned of synchronizing the closing device to the screw, this solution was generally refused since the desired portioning accuracy was never obtained due to reasons such as accumulation of stuff on shutter parts below the screw, stuff that sticks between the shutter and the feed conduit wall at the closing operation etc.

Vertical feed screw based dispensers are also known, which are provided with axial closing devices that are not fixed to the feed but to the rotating screw. One such closing device is formed by a circular disc of elastic material fixed at the screw shaft. The operation principle of the device is that the disc is bent downwards by the feed pressure formed at rotating the screw so that an annular opening is formed at the tube wall. The same principle has been proposed in another form according to which, however, the main purpose of the flexible disc is to form a lock to prevent pressure equalization between the room connected to the inlet of the screw conveyor and the room connected to the outlet of the screw conveyor. In addition to the fact that the delivery openings formed according to this principle are generally too small for the majority of the volume portioning applications and further do not permit the desired accuracy, it is based on the phenomenon that by all means is to be avoided in context with foodstuff portioning, that is compression of the material. Compression of feed concentrate and many other materials is known to create variations in the bulk density depending on where the material is positioned along the screw conveyor and to increase the always undesired tendency of material separation into different particle fractions.

The present invention has the object to achieve a screw based volume dispenser having a feed conduit provided with closing means, that is safe in operation and improves the portioning accuracy. A further object of the invention is a dispenser that is constructed to permit volume portioning through a vertical or downwards directed screw feed conduit. Still a further object is to provide a screw based volume dispenser with closing means that in a simple way can be coupled to the screw for automatic opening of the outlet conduit when the screw is started and automatic closing of said conduit when the screw stops.

SUMMARY OF THE INVENTION

These objects have been reached according to the present invention by a dispenser of the kind introductively mentioned. The invention is primarily characterized in that the feed screw at its outlet end is designed to cooperate with an element that is operable to close the feed conduit in a first position of the element with respect to the screw, and that said element is further operable, when feeding is to be started, to move with respect to the screw from said first position to a second position to form an opening that is fixed with respect to the screw and rotating with the same and to return to said first position when the feeding is stopped.

Due to the fact that the closing means according to the invention is connected to the feed screw itself, the dispenser avoids those clogging hazards and opening- and closing problems that exist in connection with the use of static shutter devices below the feed screw such as gates, butterfly valves etc. An essential part of the invention is therefore the advantageous use of the fact that the feed stream delivered from the rotating helical feed path in a vertical or downwardly sloped screw conveyor is not momentarily distributed evenly over the cross section of the screw, but the delivery occurs mainly from an effective part of the cross section which rotates with the screw. By bringing the screw-connected closing means, when the screw is in operation, into such a position that said effective part of the cross section is open, an almost undisturbed delivery is achieved and non or little outlet surface is lost.

According to a preferred embodiment the closing means consists of a disc shaped as a sector of a circle which is connected to the screw for movement relative thereto between an open position and a closed position. The disc can be arranged to be moved up and down in the axial direction, but this arrangement implies some of the disadvantages mentioned above in context with tube connected shutter devices. According to an advantageous embodiment of the invention, a sector shaped disc is instead pivotally arranged around the screw axis. The sector angle of the disc is suitably about 180°, circular feeding cross section is then divided into two almost equal sectors, that is one sector to be opened and one sector always closed, providing as large delivery opening as possible.

BRIEF DESCRIPTION OF THE DRAWING

The invention will now be further described by means of an embodiment of the same, shown only as an example, referring to the enclosed drawing, in which.

DESCRIPTION OF THE PREFERRED EMBODIMENT

Figure 1:
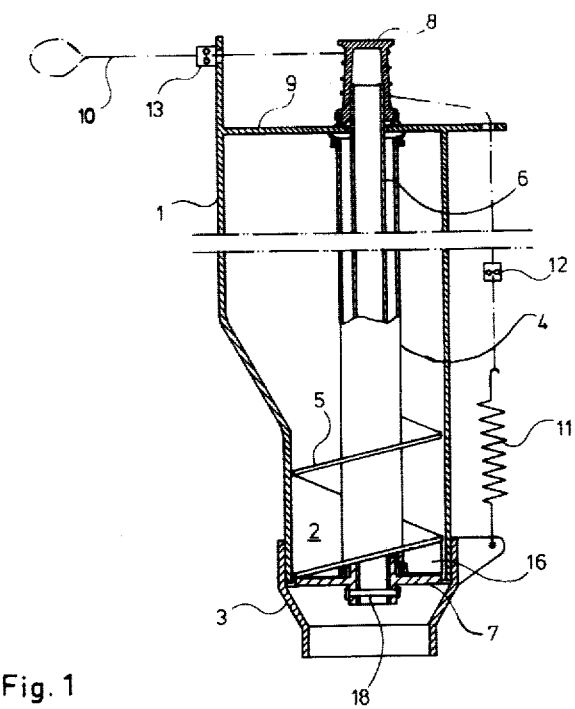
FIG. 1 shows a vertical section through a simple portioning device and FIG. 2 shows a detailed view seen from below of the closing device in the feed conduit of the device according to FIG. 1.

The volume dispenser according to FIG. 1 comprises a hopper 1, the lower end of which is connected to a circular cylindrical feeding conduit 2, having at its lower end a conical outlet 3. Coaxially with the feed conduit 2 a feed screw 4, 5 is arranged and consists of a tubular shaft 4 and a helical screw blade 5 that is fixed to the lower part of the shaft 4 to cooperate with the feed conduit 3.

Through the tubular shaft 4 of the feed screw and freely movable with respect to the same, a driving shaft 6 is arranged, to which shaft 6 is by means of a sector shaped disc 7 fixed at its lower end and a driving means 8 to which shaft 6 is fixed at its upper end, to support the feed screw in that said driving means 8 is rotatably journalled in at an element 9 fixed in the upper part of the hopper 1. A rope 10 is wound around the frusto conical driving means 8 and is fixed at one end to the hopper 1 through a spring 11. Stop means 12 and 13 are provided on the rope 10 at each side of the driving means 8 for the adjustment of the desired feeding movement.

Figure 2:
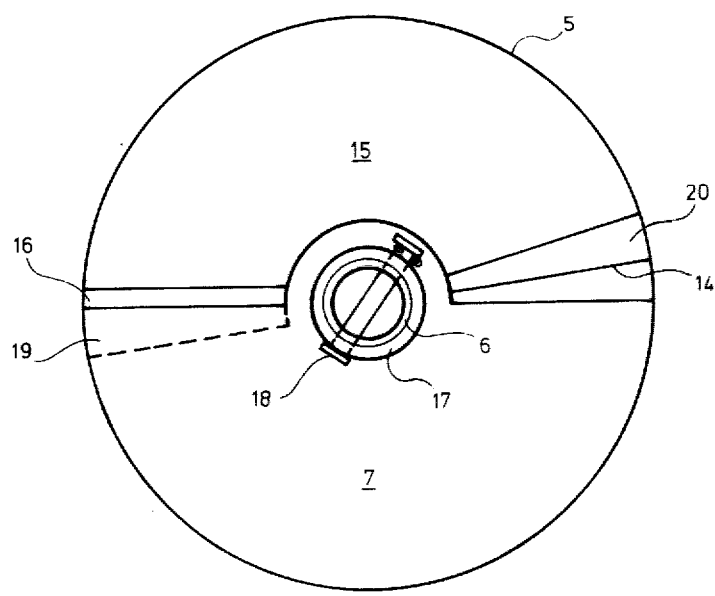

FIG. 2 shows the arrangement of the disc 7 with respect to the feed screw 4, 5 to close and open the feed conduit 2. About 180° from the radial end edge 14 of the screw blade, the screw is provided with a vertical flange 16 extending radially from the screw shaft 4 to the periphery of the screw and axially from the same level as said end edge 14 up to contact with the screw blade 5 so that a feeding sector 15 is obtained between said end edge 14 and said flange 16 when the disc 7 is brought into driving position, which position is shown in FIG. 2. The disc 7 is secured at a central tubular part 17 to the driving shaft 6 by means of a pin 18. The disc is further at one of its radial end edges and at the side facing the feed screw, provided with a driving heel 19 which, when the disc 7 is in driving position and the feeding sector 15 is opened, presses against the flange 16 and drives the screw 4,5. The driving heel 19 also serves as a stop against a corresponding heel 20 fixed on the radial end edge 14 of the screw blade when the disc 7 returns to its resting position and closes the feed opening 15.

The operation of the dispenser shown in FIG. 1 and FIG. 2 will now be described. The portioning is started by pulling the rope 10. Due to the friction caused by the feeding stuff in the hopper 1, the feed screw 4,5 does not move while the disc 7 being considerably easier to move, is turned by the driving shaft 6 about half a revolution (clockwise in FIG.2) until is driving heel 19 reaches the flange 16 of the screw blade and the feeding sector 15 between the flange 16 and the radial end edge 14 of the screw blade is opened, as shown in FIG. 2. Then the feed screw is driven a limited number of rounds as determined by the position of the stop 12 on the rope 10. As long as the feeding movement is maintained, the feeding sector 15 will rotate with the screw 4,5. When the rope 10 is released, the streched spring 11 starts to pull the rope 10 back to its original position, thereby first bringing the comparatively easily movable driving shaft 6 and disc 7 to rotate about half a revolution, in the opposite direction to the feeding movement of the screw until the drive heel 19, reaches the stop heel 20 on the feed screw. Due to said friction against the feed stuff in the hopper 1, the spring force is unable to rotate the feed screw but instead rewinds the rope 10 around the frusto conical driving means 8 until the rope is stopped by the stop 13, that is when the start position has been reached. The conical design of the driving means 8 facilitates winding and rewinding of the rope.

The example above relates to an extremely simple manually operated dispenser, the driving means of which generally only consisting of a rope wound directly around the drive shaft of the feed screw. Since the device according to the invention can be provided with any type of driving device, the example embodiment presents nevertheless all the essential characteristics of the invention. According to a more generally defined embodiment of the invention, the drive shaft and a closing element fixed to the same are by means of any mechanical coupling means connectable to an automatic or manual driving device, which at the start of a feeding period is caused to drive the feed screw a predetermined number of rounds or during a certain period of time. To rotate the closing element and the drive shaft relative to the feed screw from feeding position to closed position when the driving momemt from the driving device has ceased, a return spring is provided between the drive shaft or the closing element and the feed screw.

It will be understood that the part 8, which is a drum, constitutes a driving means in the sense that it drives shaft 6 in one direction when rope 10 is pulled and in the opposite direction when the rope is released. More particularly, when the rope is pulled from the position shown in FIG. 1, spring 11 is stretched and at the same time a certain length of the rope is wound onto drum 8 from the right while a corresponding length is unwound from the drum to the left, until adjustable stop 12 engages element 9. The resulting rotation of drum 8 drives disc 7 clockwise as viewed in FIG. 2. When spring 11 contracts upon release of the rope, the rope is wound on the drum from the left (FIG. 1) and unwound from the drum to the right, thereby driving disc 7 counterclockwise (FIG. 2) until adjustable stop 13 reengages hopper 1.

Because drum 8 tapers upwardly as shown in FIG. 1, it tends to keep the rope 10 distributed evenly along the length of the drum during the above-mentioned winding and unwinding, thereby facilitating the same.

I claim:

1. A dispenser comprising a hopper, a delivery conduit leading from the hopper, said conduit having a cylindrical part and an outlet therefrom, a feed screw rotatable in said cylindrical part to deliver material from the hopper through said outlet, the feed screw having an outlet end adjacent said outlet, an element coacting with the feed screw at said outlet end and rotatable between first and second positions relative to the screw, said element in said first position closing said delivery conduit, said element in said second position performing with the screw a discharge opening through the delivery conduit, and driving means connected to said element for rotating the element from said first to said second position and thereafter rotating the screw while maintaining said element in its said second position, thereby delivering material through said discharge opening, said delivering means being operable to rotate said element from its said second to its said first position to terminate said delivery.

2. The dispenser of claim 1, wherein the screw at said outlet end forms a delivery sector which rotates with the screw in said cylindrical part, said element being a disc which in said first position blocks said sector and in said second position uncovers said sector.

3. The dispenser of claim 2, in which the feed screw includes a central shaft and a helical screw blade fixed to the shaft, the screw blade having a radial end edge and also having a flange extending radially outward from said shaft to the periphery of the screw blade, said flange extending upwardly from said end edge into contact with the screw blade, said delivery sector extending from said radial end edge to said flange.

4. The dispenser of claim 1, in which said screw and said element are rotatable about a common axis.

5. The dispenser of claim 1, comprising also a drive shaft connecting said driving means to said element, said shaft being rotatable relative to the screw about an axis common to the rotation axis of the screw, said shaft being rotatable by the driving means in one direction to rotate said element from said first to said second position and then to rotate the screw together with said element in said one direction, said shaft being rotatable by the driving means in the opposite direction to return said element to said first position relative to the screw.

6. The dispenser of claim 5, in which said driving means include a drum secured to said shaft, a rope wound around the drum, and a spring fixed at one end and secured at the other end to one end of the rope, the other end of the rope being free, whereby pulling said free end of the rope stretches the spring while rotating said shaft in said one direction, the shaft being rotated in the opposite direction by contraction of the spring upon release of the rope.

7. The dispenser of claim 6, in which said drum is frustoconical.

8. The dispenser of claim 5, comprising also adjustable means for limiting rotation of the drive shaft in said one direction and thereby limiting the amount of material dispensed through said discharge opening.

9. A dispenser comprising a hopper, a delivery conduit leading from the hopper, said conduit having a cylindrical part and an outlet leading therefrom, a feed screw rotatable in said cylindrical part to deliver material from the hopper through said outlet, the feed screw having an outlet end adjacent said conduit outlet, an element coacting with the feed screw at said outlet end and rotatable with the screw, said element also being movable between a first position and a second position relative to the screw, said element in said first position closing said delivery conduit, said element in said second position forming in the conduit a discharge opening which is fixed relative to the screw and which rotates with the screw, and driving means for moving said element from said first to said second position independently of the screw and thereafter rotating the screw to deliver material through said discharge opening, said driving means being operable to move said element from said second to said first position independently of the screw to terminate said delivery.

* * * * *